(12) United States Patent
Wen

(10) Patent No.: US 7,909,156 B2
(45) Date of Patent: Mar. 22, 2011

(54) TURNOVER DEVICE

(75) Inventor: Bin Wen, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 12/061,549

(22) Filed: Apr. 2, 2008

(65) Prior Publication Data

US 2008/0283359 A1 Nov. 20, 2008

(30) Foreign Application Priority Data

May 15, 2007 (CN) .......................... 2007 2 0149141

(51) Int. Cl.
*B65G 47/252* (2006.01)
*B65G 47/248* (2006.01)

(52) U.S. Cl. .................. 198/403; 198/409; 198/468.8; 198/441; 198/414; 198/346.1

(58) Field of Classification Search ............... 198/346.1, 198/441, 414, 759
See application file for complete search history.

(56) References Cited

U.S. PATENT DOCUMENTS

| 3,895,722 A | * | 7/1975 | Pluntz | .......................... | 414/766 |
| 4,504,186 A | * | 3/1985 | Richards | .................... | 414/744.3 |
| 4,505,186 A | * | 3/1985 | Meier et al. | .................... | 92/5 R |
| 5,100,284 A | * | 3/1992 | Boisseau | .................... | 414/744.3 |
| 5,291,217 A | * | 3/1994 | Blanding et al. | .............. | 347/225 |

* cited by examiner

Primary Examiner — Gene Crawford
Assistant Examiner — Kavel Singh
(74) Attorney, Agent, or Firm — Sheridan Ross P.C.

(57) ABSTRACT

A turnover device for turning over a substrate comprises a motor and a tumbler driven by the motor to rotate. The tumbler is provided with a transmission mechanism thereon and connected to an upper turntable and a lower turntable with the transmission mechanism, the tumbler can drive the upper turntable and the lower turntable to rotate, the transmission mechanism can drive the upper turntable and the lower turntable to move toward each other, and the substrate to be turned over is disposed between the upper turntable and the lower turntable.

5 Claims, 2 Drawing Sheets

TURNOVER DEVICE

FIELD OF THE INVENTION

The present invention relates to a turnover device that can be used in a cell assembly process of a thin film transistor liquid crystal display (TFT LCD).

BACKGROUND OF THE INVENTION

During manufacturing of a TFT LCD, after the processes of dropping liquid crystal, coating sealant and coating conductive film have been conducted on an array glass substrate and a color-film glass substrate respectively, the glass substrate has to be turned over by 180 degrees so as to be aligned with another glass substrate in a cell assembly process. After the alignment process and before curing the sealant with ultraviolet light, an operation to turn over the aligned glass substrates by 180 degrees sometimes may be required once again due to the process conditions. Therefore, the turnover operations of a glass substrate are necessary in the assembly process of a liquid crystal panel.

A conventional turnover device is shown in FIG. 4, which includes a motor 1, a tumbler 2, a turntable 20 mounted on the tumbler 2, and aligning clamps 6 and vacuum suckers 7 mounted on the turntable 20. A glass substrate is turned over by using the turntable 20, and then the glass substrate will be taken out of the device by a manipulator.

The specific operation procedure of the conventional turnover device is as follows: a glass substrate 10 is placed on the turntable 20; blowing gas is allowed to start, the glass substrates are aligned in X-axis and Y-axis with the aligning clamps 6 driven by a cylinder, and then blowing gas is stopped; a vacuum pump is turned on to operate the vacuum suckers 7 so as to suck the glass substrate 10; the glass substrate 10 is clamped by the aligning clamps 6; the tumbler 2 is driven to rotate by using the motor 1 so that the turntable 20 turns over the glass substrate 10 by 180 degrees; the manipulator accesses the turnover device from below and ascends a distance; the aligning clamps 6 release the glass substrate 10, the vacuum pump is turned off and then the vacuum suckers 7 release sucking of the glass substrate; and the manipulator waits for the glass substrate 10 to fall onto it and then descends and moves away.

It can be seen from the above operation procedure that the conventional turnover device has the following technical defects:

(1) In order to ensure that the glass substrate falls onto the manipulator stably, the manipulator has to wait for a relatively long time after it accesses the turnover device, and it will take 14 seconds to complete the whole action of taking out, which lowers the efficiency and capability of production to a certain extent.

(2) The glass substrate is held only by the sucking of the vacuum suckers distributed in a center portion of the turnover device, after it is turned over. When the sucking of the vacuum suckers is released, the glass substrate falls onto the manipulator in a freely falling manner, and although a gap between the glass substrate and the manipulator is very small, the free falling of the uncontrolled glass substrate will necessarily cause a positional deviation of the glass substrate. Such positional deviation will affect the alignment accuracy in a subsequent process and increase the possibility of failure of the products.

SUMMARY OF THE INVENTION

The object of the present invention is to provide a quick-tempo turnover device, which is also capable of overcoming the technical defect in the related art that a positional deviation will be caused due to the glass substrate being out of control.

For the above purpose, an embodiment of the present invention provides a turnover device for turning over a substrate, comprising a motor and a tumbler driven by the motor to rotate. The tumbler is provided with a transmission mechanism thereon and connected to an upper turntable and a lower turntable with the transmission mechanism, the tumbler can drive the upper turntable and the lower turntable to rotate, the transmission mechanism can drive the upper turntable and the lower turntable to move toward each other, and the substrate to be turned over is disposed between the upper turntable and the lower turntable.

In the turnover device with a structure of two turntables according to the embodiment of the present invention, as the glass substrate is sucked and held between the upper turntable and the lower turntable so as to be turned over, it is possible to shorten the time for the turnover and taking out processes, reduce the production time to a large degree, speed up the tempo of the device and thus largely improve the production capability of the device. Furthermore, it is also possible to overcome the technical defect in the related art that a positional deviation will be caused due to the glass substrate being out of control, thereby improving the alignment accuracy of the glass substrate in a subsequent process and reducing the possibility of failure of the products.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Figure 1:
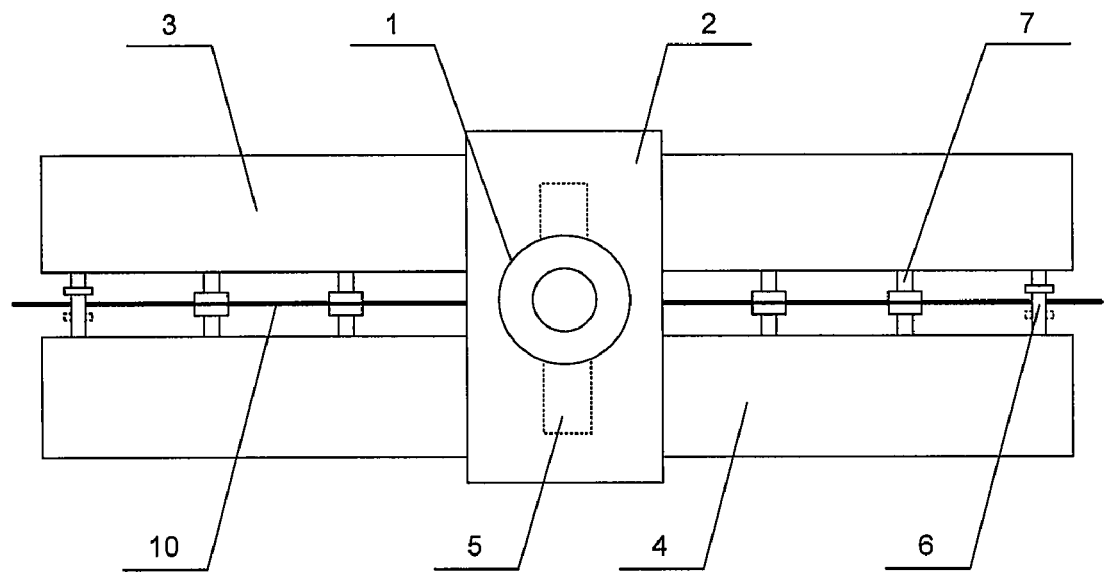
FIG. 1 is a schematic structural diagram of a turnover device according to an embodiment of the present invention.

FIG. 1 is a schematic structural diagram of a turnover device according to an embodiment of the present invention. This turnover device is a quick-tempo turnover device compared with the conventional turnover device. As shown in FIG. 1, the quick-tempo turnover device according to the embodiment of the present invention includes a motor 1, a tumbler 2, an upper turntable 3, a lower turntable 4, and a transmission mechanism 5. The tumbler 2 is connected to and driven by the motor 1 so as to be rotated. The upper turntable 3 and the lower turntable 4 are arranged opposite to each other, and connected in a transmissible manner to an upper end and a lower end of the tumbler 2 with the transmission mechanism 5, respectively. The upper turntable 3 and/or the lower turntable 4 are driven to move toward each other by the transmission mechanism 5, and can be turned over by 180 degrees along with the rotation of the tumbler 2. Particularly, a lower surface of the upper turntable 3 and the upper surface of the lower turntable 4 are provided with aligning clams 6 and vacuum suckers 7, respectively. The aligning clamps 6 are arranged at four corners of the upper turntable 3 and the lower turntable 4, and are driven by a cylinder to conduct the alignment operation of the glass substrate in X-axis and Y-axis. The vacuum suckers 7 are provided for sucking the glass substrate 10, so as to turn over the glass substrate 10 with the upper turntable 3 and the lower turntable 4.

The operation procedure of the quick-tempo turnover device according to the embodiment of the present invention is as follows: the glass substrate 10 is placed on the lower turntable 4; a vacuum pump is turned on to operate the vacuum suckers 7 on the lower turntable 4 so as to suck the glass substrate 10; the upper turntable 3 moves downwardly so that the vacuum suckers 7 on upper turntable 3 touches the glass substrate 10; the motor 1 drives the tumbler 2 to rotate, the upper turntable 3 and the lower turntable 4 have the glass substrate 10 turn over by 180 degrees, and at this time, the upper turntable 3 is positioned below the lower turntable 4; the vacuum pump is turned off to release the sucking of the vacuum suckers 7 of the lower turntable 4, and the lower turntable 4 moves upwardly; blowing gas is allowed to start, the aligning clamps 6 conducts the alignment of the glass substrate 10 in X-axis and Y-axis; and the blowing gas is stopped and the glass substrate 10 is moved out of the upper turntable 3.

The above embodiment of the present invention provides a quick-tempo turnover device with two turntables. As the glass substrate is sucked and thus held between the upper turntable and the lower turntable so as to be turned over, it is made possible to shorten the time for the turnover and taking out processes, reduce the production time to a large degree, speed up the tempo of the device and thus greatly improve the production capability of the device. Furthermore, it is also made possible to overcome the technical defect in the related art that a positional deviation will be caused due to the glass substrate being out of control, thereby improving the alignment accuracy of the glass substrate in a subsequent process and reducing the possibility of failure of the products.

In the following Table 1, the time for an operation flow of a turnover device according to the embodiment of the present invention and that of a conventional turnover device are compared.

TABLE 1 a comparing table of the time for the operation flows of the present invention and the related art

| The operation flow of in a conventional device | Time (s) | The operation flow of the embodiment | Time (s) |
|---|---|---|---|
| placing the glass substrate on the turntable | 7 | placing the glass substrate on the lower turntable | 7 |
| blowing gas beginning | 2 | turning on the vacuum pump/the upper turntable moving | 2 |
| aligning in X-axis and Y-axis | 2 | | |
| stopping blowing gas | 1 | the motor rotating | 21 |
| turning on the vacuum pump | 1.5 | turning off the vacuum pump | 2 |
| clamping | 1 | the lower turntable | 2 |

TABLE 1-continued a comparing table of the time for the operation flows of the present invention and the related art

| The operation flow of in a conventional device | Time (s) | The operation flow of the embodiment | Time (s) |
|---|---|---|---|
| the motor rotating | 21 | moving/blowing gas beginning | |
| the manipulator accessing | 2 | aligning in X-axis and Y-axis | 2 |
| the manipulator moving upwardly | 1.5 | stopping blowing gas | 1 |
| releasing clamping | 3 | taking out the glass substrate | 7 |
| turning off the vacuum pump | 2 | | |
| the manipulator waiting the glass substrate to fall onto its arm | 1.5 | | |
| the manipulator moving downwardly | 1.5 | | |
| the manipulator moving out | 2 | | |
| total | 49 | | 44 |

It can be seen in Table 1 that the operation flow of the conventional turnover device takes 49 seconds, while for the turnover device according to the embodiment of the present invention, as a construction of two turntables is employed, which largely changes the operation flow and allows the glass substrate to be directly taken out by the manipulator, the time for the manipulator to move up and down and wait during taking out the glass substrate after the turnover in the conventional turnover device is shortened, and the whole operation flow takes only 44 seconds, being reduced by 5 seconds. The turnover device according to the embodiment of the present invention becomes a quick-tempo turnover device, which reduces the time necessary for the production process and largely improves the production capability of the device.

From the operation flow of the turnover device according to the embodiment of the present invention, it can also be seen that, the glass substrate is transferred to another turntable after it is turned over by the upper turntable and the lower turntable. During this operation, the glass substrate receives supporting forces from the overall machine. Compared with the technical solution that the glass substrate is supported by an arm of the manipulator in the conventional turnover device, the supporting forces in the embodiment of the present invention are more sufficient and distributed more uniformly, so that the possibility for the glass substrate to deviate is reduced greatly, and a beneficial effect of reducing the time delay occurring during the alignment in a downstream device is provided as well On the basis of the above embodiment, the present invention may be implemented with various structures. For example, the transmission mechanism can be provided in a form of a link mechanism, a cam mechanism, a gear mechanism, a worm-worm gear mechanism, a tape transmission, a chain transmission and so on, preferably in the form of a screw rod transmission.

Figure 2:
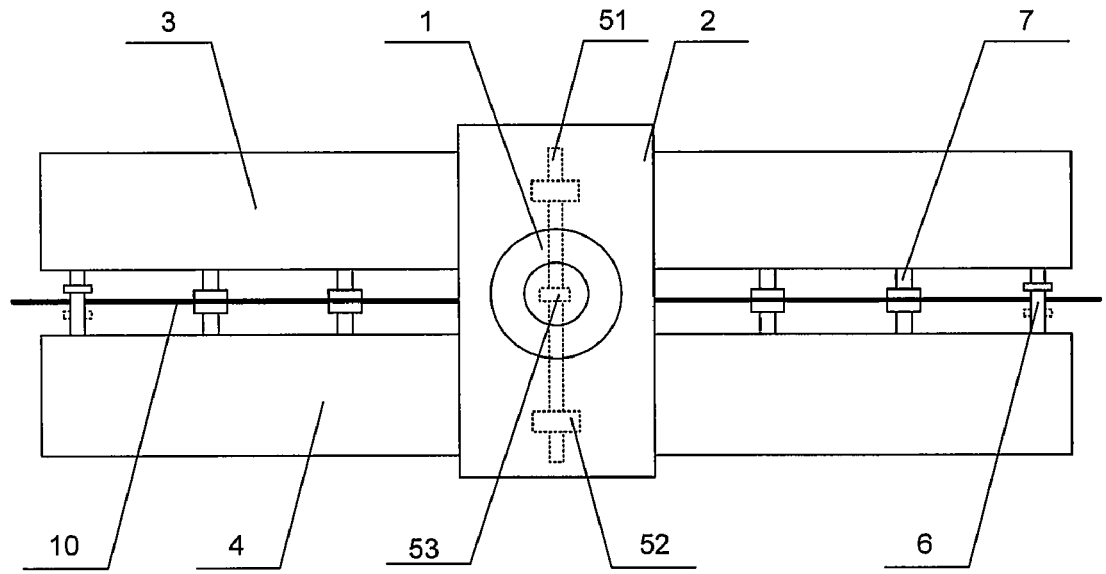
FIG. 2 is a schematic structural diagram of a turnover device according to another embodiment of the present invention.

FIG. 2 is a schematic structural diagram of a turnover device according to another embodiment of the present invention. On the basis of the embodiment as shown in FIG. 1, the transmission mechanism of this embodiment further employs a screw rod transmission. The screw rod transmission includes a screw rod 51, a nut 52 and a driving motor 53. The screw rod is connected to the tumbler 2 and is driven to rotate by the driving motor 53 connected thereto. The nut 52 is connected to the upper turntable and the lower turntable and threaded on the screw rod 51, forming connection in a transmissible manner between the nut 52 and the screw rod 51. The driving motor 53 operates to drive the screw rod 51 to rotate, which in turn allows the nut 52 to drive the rectilinear motion of the upper turntable 3 or the lower turntable 4.

In the above described embodiments of the present invention, especially the screw rod transmission is used as the transmission mechanism, which not only improves the transmission efficiency, but also has the advantage of high control precision. Therefore, the embodiments of the present invention can be widely applied to the turnover operation in the assembly process of a TFT LCD.

Figure 3:
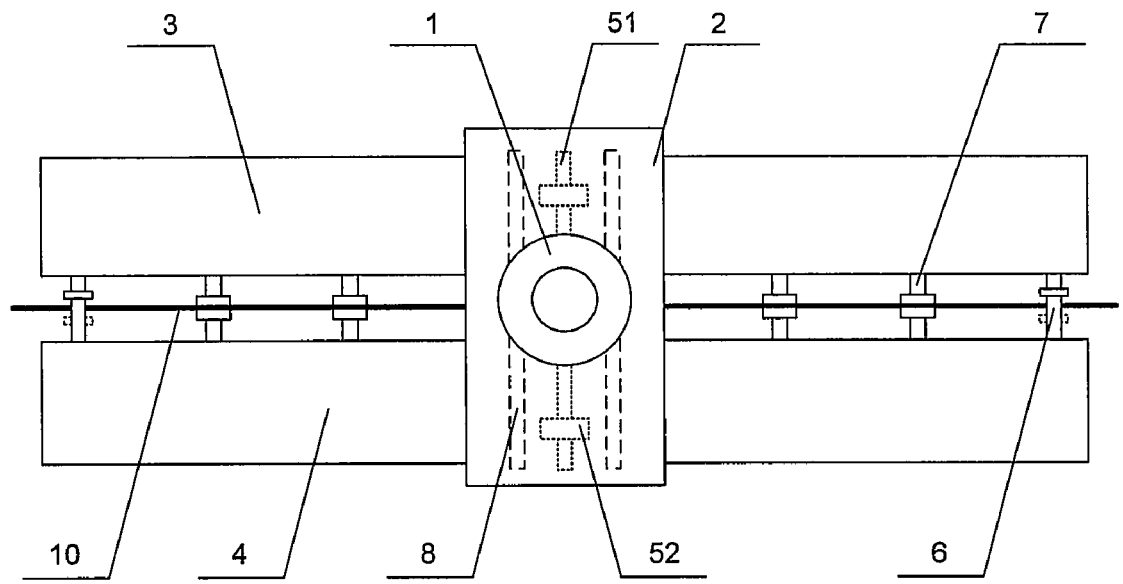
FIG. 3 is a schematic structural diagram of a turnover device according to still another embodiment of the present invention.
Figure 4:
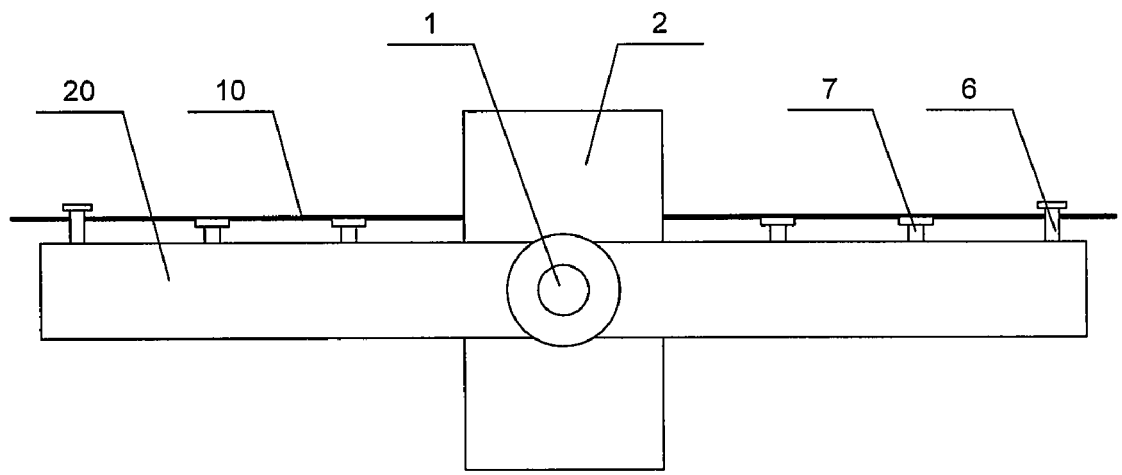
FIG. 4 is a schematic structural diagram of a conventional turnover device.

FIG. 3 is a schematic structural diagram of a turn over according to still another embodiment of the present invention. On the basis of the embodiment shown in FIG. 2, the quick-tempo turnover device of this embodiment further comprises a guide rail 8 provided on the tumbler 2. The guide rail 8 is slideably connected with the upper turntable 3 and the lower turntable 4, allows the upper turntable 3 and/or the lower turntable 4 to move up and down along the guide rail 8, and ensures the precision of the rectilinear motion of the upper turntable 3 and/or the lower turntable 4. Further, there may be two rails 8 that disposed on the tumbler 2 in parallel as shown in FIG. 3.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A turnover device for turning over a substrate, comprising
   a tumbler that is selectively rotated by a motor;
   an upper turntable operably interconnected to the tumbler, the upper turntable adapted for independently selectively securing the substrate, wherein the upper turntable comprises first aligning clamps and first vacuum suckers, the first aligning clamps are arranged around four corners of the upper turntable and the first vacuum suckers are arranged across the upper turntable;
   a lower turntable operably interconnected to the tumbler positioned directly beneath the upper turntable, the lower turntable adapted for independently selectively securing the substrate, wherein the lower turn table comprises second aligning clamps and second vacuum suckers, the second aligning clamps are arranged around four corners of the lower turntable and the second vacuum suckers are arranged across lower turntable;
   a transmission mechanism associated with the tumbler that selectively moves at least one of the upper turntable and the lower turntable to change the distance therebetween; and
   wherein the turntable tumbler rotates the upper turntable and the lower turntable such that the lower turntable to a position directly above the upper turn table and during the rotating the first and second vacuum suckers of both the upper turntable and the lower turntable suck and hold the substrate between the upper and lower turntables.

2. The turnover device of claim 1, wherein the tumbler is further provided with a guide rail slideably connected to the upper turntable and the lower turntable.

3. The turnover device of claim 2, wherein two guide rails are provided on the tumbler in parallel.

4. The turnover device of claim 1, wherein the transmission mechanism is a screw rod transmission mechanism.

5. The turnover device of claim 4, wherein the screw rod transmission mechanism comprises a screw rod connected to the tumbler, a nut connected to the upper turntable and the lower turntable and connected in a transmissible manner to the screw rod, and a driving motor for driving the screw rod to rotate.

* * * * *